FIG. I

INVENTOR
KARL EICKMANN
BY Michael S. Striker,
ATTORNEY

May 12, 1970     K. EICKMANN     3,511,111
HYDROSTATIC-MECHANIC TRANSMISSIONS, PUMPS, MOTORS
Filed Dec. 6, 1967     3 Sheets-Sheet 2

INVENTOR:
KARL EICKMANN

BY

ATTORNEY

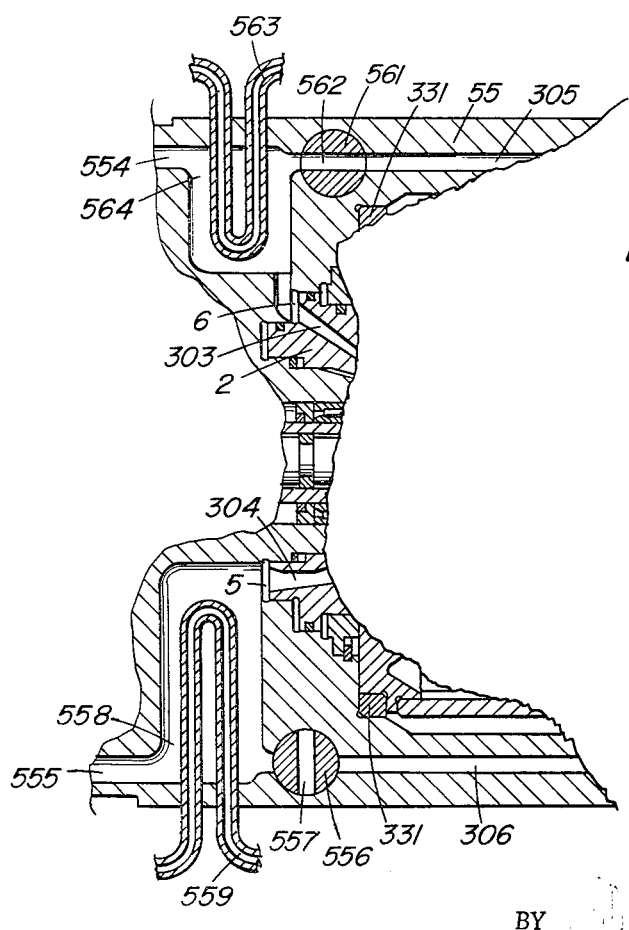

United States Patent Office 3,511,111
Patented May 12, 1970

3,511,111
HYDROSTATIC-MECHANIC TRANSMISSIONS,
PUMPS, MOTORS
Karl Eickmann, 2420 Isshiki, Hayama-machi,
Kanagawa-ken, Japan
Filed Dec. 6, 1967, Ser. No. 688,564
Claims priority, application Germany, Dec. 10, 1966,
E 33,018
Int. Cl. F16h 47/04; F16d 33/02; F16b 1/10
U.S. Cl. 74—687                                    7 Claims

ABSTRACT OF THE DISCLOSURE

A variable transmission comprises an input shaft connected by a differential transmission with a central connecting shaft and with the shaft of a pump which is connected with a hydrostatic motor and forms with the same a hydrostatic transmission. The shaft of the motor, and the end of the central connecting shaft, are connected with an overrunning clutch means which couples either the motor shaft of the connecting shaft with the output shaft of the variable transmission. The pump and the motor are independently adjustable to vary the displacement volume thereof whereby the torque of the input shaft is transmitted either through the hydrostatic pump-motor transmission, or through a mechanical transmission including the central connecting shaft which passes through the centers of the pump rotor and motor rotor.

BACKGROUND OF THE INVENTION

In known hydraulic-mechanic transmissions, power is transferred either hydraulically or mechanically, or in variable ratios between the hydraulic and mechanic transmission. In the prior art, the shifting from the hydrostatic transmission to a mechanical transmission, or vice versa, is not entirely smooth and convenient, or automatic.

SUMMARY OF THE INVENTION

It is one object of the invention to provide a hydrostatic-mechanic transmission which operates smoothly and economically, and which can be compactly and inexpensively built.

Another object of the invention is to render either the mechanical or the hydrostatic transmission of torque effective by adjusting the displacement volume of the motor or of the motor and pump of the hydrostatic transmission.

When the displacement volume of the motor is adjusted to its minimum value, the motor is self-locked since its fluid friction becomes extremely high. In this condition, the torque is transmitted by the mechanical transmission. A speed responsive governor is advtangeously used for increasing the displacement volume of the motor again as soon as the rotary spood of the output shaft of the transmission is reduced to a predetermined minimum. Upon increase of the displacement volume of the motor, the motor starts rotating again and the pressure in the pump decreases so that the pump can also rotate and all power can be transmitted from the input shaft through the hydrostatic transmission to the output shaft. In this manner, a hydrostatic-mechanic transmission is obtained which is gradually and continuously variable in a low speed hydrostatic range, and which changes from the hydrostatic transmission to the mechanical transmission when the output shaft operates at high speed. The variation of the transmission is effected in the low speed high torque range by adjustment of the hydrostatic pump. In the middle speed range, additional adjustment of the variable hydrostaic motor is required and at the high speed range, the transmission is shifted to mechanical power transmission.

It is a further object of the invention to provide a fluid flow from both axial ends to and from the pump and motor of a hydrostatic transmission. In this manner, the flow through the transmission can be doubled as compared with hydraulic transmissions according to the prior art. According to another object of the invention, axially movable bodies are provided in the hydrostatic transmission, and are pressed together by a fluid operated end member for smooth operation with little leakage. An axially movable body is preferably provided between the rotors of the pump and motor, and is sliding engagement with lateral faces of the same.

The preferred embodiment of the invention comprises a hydrostatic transmission including a rotory pump and a rotary motor in fluid communication, pump adjusting means for varying the displacement volume of the pump, and motor adjusting means for varying the displacement volume of the motor, the pump and motor having a hollow pump shaft and a hollow motor shaft in which a central connecting shaft is mounted in free rotation. An input shaft is connected by a differential transmission with the connecting shaft and with the pump shaft, and transmits power from the input shaft depending on the load torque produced by the pump. An output shaft is connected by an overrunning clutch transmission either with the central connecting shaft or with the motor shaft depending on the relative speeds of the connecting shaft and motor shaft. In this manner by the adjustment of the displacement volumes of the pump means and motor means, different speed ratios and different torque ratios between the input shaft and the output shaft are obtained, and the power flows through the hydrostatic transmission when a high torque is desired at the output shaft, and flows through the mechanical transmission including the central connecting shaft when a high speed is required.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 is a fragmentary axial sectional view illustrating a modified portion of the transmission.

DESCRIPTION OF THE PREFERRED EMBODIMENT

Figure 1:
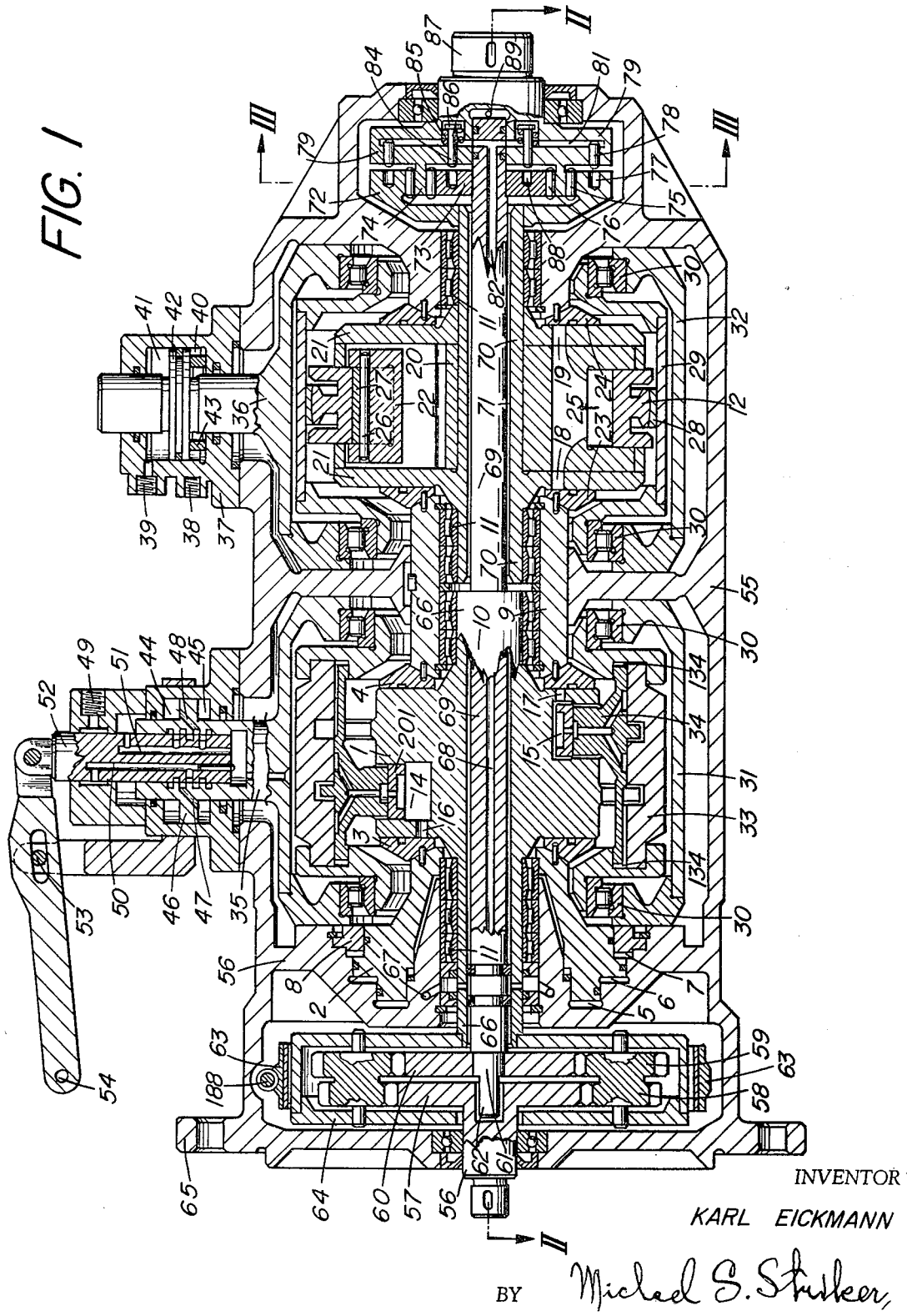
FIG. 1 is a longitudinal axial sectional view illustrating a preferred embodiment of the invention.

Referring now to the drawing, a housing 55 envelops a hydrostatic pump 1 of the radial piston type having a pump rotor 1, and a hydrostatic motor having a motor rotor 20 and being of the vane type. A transmission including elements 73–81 connects the hollow shaft 70 of the motor with output shaft 87, and a differential gear transmission 57–60 and 64 connects the input shaft 56 with the hollow pump shaft 66 and with connecting shaft 61, 62, 69 which carries at its other end a member 73, and can also be connected by the clutch means with the output shaft 87.

Pump rotor 1 has displacement chambers 14 and 15 into which displacement pistons 201 enter for cyclically expanding and contracting the displacement chambers 14, 15. Displacement chambers are also provided in motor rotor 20, and while displacement chambers 14, 15 of the radial piston pump are cylinders, chambers 25 in the motor rotor 20 are intervane spaces between the rotor 20, casing 12, end walls 21 and vanes 22. Displacement means 12, 22, 26, 27 cooperate with a motor rotor to effect expansion and contraction of the displacement chambers 25.

The displacement stroke of the displacement pistons 201 of the pump is effected by displacement actuator 33, while the displacement strokes of the displacement members of motor 20 is actuated by displacement actuator 12, 28, 32. Displacement actuators 12 or 33 are rotatably carried in bearings 30 for revolution about their respective axes. The axes of the displacement actuators are eccentrically spaced from the aligned axes of the rotors of the pump and motor, and the distance between the parallel axes is adjustable, and can be independently adjusted for the pump and for the motor to vary the displacement volume of the pump and motor independently of each other.

Figure 2:
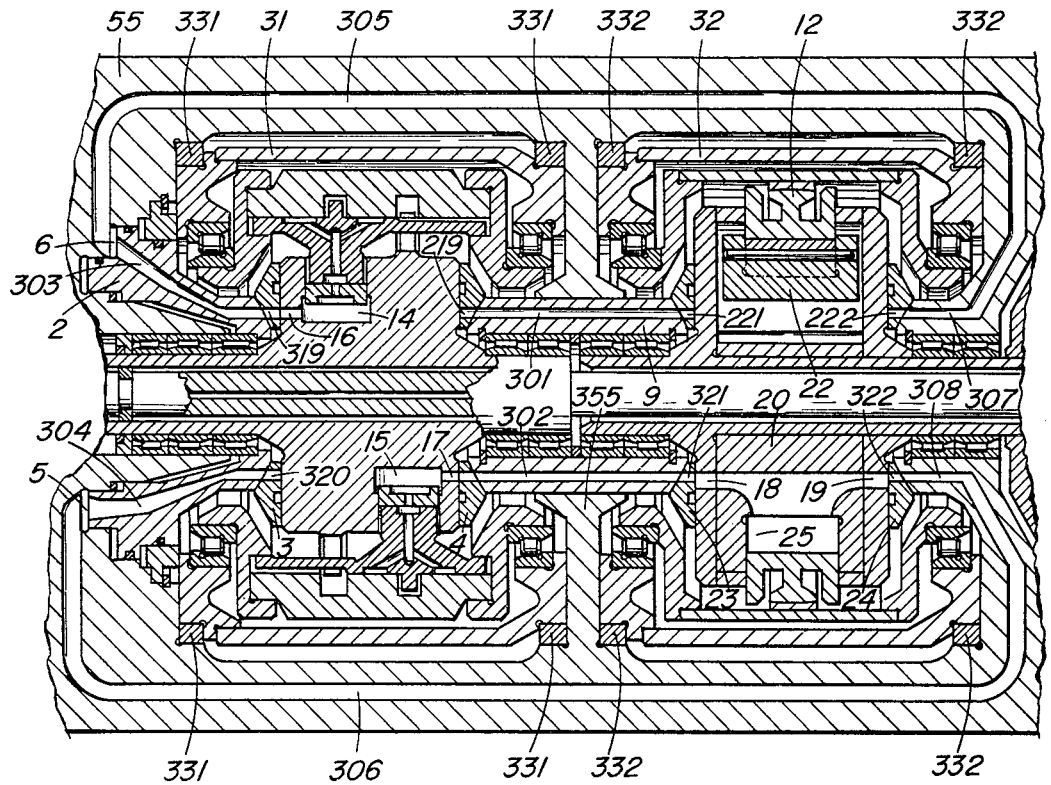
FIG. 2 is an axial sectional view taken on line II—II of FIG. 1.

As best seen in FIG. 2, fluid is pressed out of contracting working chambers 15 in the pump rotor 1 and flows through rotor passages 17 and a conduit in an annular abutment body 4 abutting rotor 1, and then flows through fluid conduit 302 and a port 321 through abutment member 23 abutting motor rotor 20, and further through passages 18 into the expanding working chambers 25 of the hydraulic motor 20 so that the respective displacement chambers 25 expand and cause rotation of the motor rotor 20. The return flow flows out of contracting displacement chambers 25 of motor rotor 20 through the respective abutment members, ports and passages; 8, 221, 23, 301, 219, 4, 17 into the expanding displacement chambers in pump rotor 1. If the displacement adjusting means 55 adjust the pump beyond its zero stroke and idling position, then the flow of fluid reverses its direction.

It is an important feature of the invention that the second delivery and return flow is possible which greatly increases the maximum capacity for the transmission of power in a transmission of a given size, and which at the same time makes it possible to cool with the fluid in a simple and efficient manner, while increasing the efficiency of the hydrostatic transmission. For this second fluid flow, fluid is pressed out of the contracting displacement chambers 14 through rotor passages 16, a port 319 in an abutment body 3 which abuts pump rotor 1, and then through fluid passage 304 which extends through the end member 2, whereupon the fluid flows through chamber 5 at the end of end member 2, passage members 306, 308 which lead to control port 322 of an annular abutment member 24 abutting motor rotor 20, and finally the fluid flows through the respective rotor passages 19 into the expanding displacement chambers 25 in the motor rotor 20. The fluid return flow occurs in this condition from the contracting displacement chambers in motor rotor 20 through rotor passages, control ports, abutment members and passages 19, 222, 24, 307, 305, 6, 303, 319, 3 and 16 into the expanding displacement chambers 14 of the hydrostatic pump.

The second fluid flow can be provided through the housing of the transmission, for example passages 305 and 306 may be provided along the outer wall of the transmission, so that it is easily possible to provide cooling heat exchangers 563, 559, as shown in FIG. 5. The provision of the second fluid flow path is also valuable for gaining cross-sectional space. By having two flows to and from the pump and motor, the available space for control ports and through its passages is practically doubled, as compared with the prior art.

All fluid flow directions can be reversed, either by changing the direction of rotation of input shaft 56, or by adjusting the displacement actuator 33 of the pump beyond the zero position in which no displacement takes place.

In accordance with the present invention, the end member 2 and a central abutment member 9 of annular shape are mounted for axial movement with the motor rotor and pump rotor for obtaining a good sealing. A portion of housing 55 has a seat for an annular end member 24 on which end walls 21 of the motor rotor 20 abut. The end member 2 defines with a portion of housing 55 control chambers 5 and 6, and a passage 303 is connected with space 6, and a passage 304 is connected with space 5. A counteracting fluid containing space is provided for pressing member 2 away from the pump rotor. End member 2 abuts an annular abutment member 3 which slidably engages an end face of rotor body 1. The central abutment member 9 is mounted on a housing portion between the pump and the motor, and is movable in axial direction to a limited extent. Means are provided for preventing rotation of abutment member 9 which abuts an abutment member 23 which slides on a face of wall 21 of rotor 20. At the other side of abutment member 9, the annular abutment member 4 is located in sliding engagement with the other end face of pump rotor 1. Thus, fluid under pressure in chambers 5 and 6 presses end member 2 against abutment member 3 and the same against pump rotor 1 which is pressed against abutment member 4 which presses against central abutment member 9 so that the same presses against abutment member 23 which is urged into engagement with the motor parts 21 so that the motor rotor 20 is pressed against abutment member 24 which abuts a portion of housing 55. Due to this arrangement, all parts of hydrostatic transmission are held in a tightly sealed condition, although only one fluid containing chamber is used at any time.

The displacement stroke adjustment member 35 for the pump, and 36 for the motor, are guided in members 331 and 332. The stroke adjustment is effected by varying the distance between the axes of the respective rotor, and the respective displacement stroke actuators 33, 31, or 12, 32, 36, 28, 29. It is preferred to connect adjusting member 35 with a piston 46, and adjusting member 36 with a piston 42 which are operated by fluid in the respective cylinders.

In the illustrated embodiment, a hydraulic cylinder 37 is provided on top of the housing 55, and piston 42 is located in cylinder 37, and connected with adjustment member 36 for adjusting the displacement stroke and displacement volume of the hydrostatic motor. Piston 42 defines two chambers 40 and 41 in cylinder 37 so that piston 42 can be moved in opposite direction when fluid flows into chamber 41 through passage 39 or in the chamber 40 through the passage 38. A stop 43 is provided in chamber 40 and limits the movement of piston 42 so that the displacement means of the hydrostatic motor cannot be adjusted all the way to the zero stroke in which the axis of the displacement means coincide with the axis of the motor rotor 20. The stop 43 assures that the adjustment device can move the hydrostatic motor only to a minimum displacement volume in which self-locking takes place due to the developing high fluid friction, but placement of the hydrostatic motor in the zero stroke position must be avoided because in this condition, the motor may revolve in either direction so that the transmission would not properly function.

The adjustment means for the pump include a hydrostatic cylinder receiving piston 46 which forms chambers 44 and 45 in the cylinder. The cylinder is fixed to the housing 55 and the piston 46 is fixed to the stroke adjustment member 33 by adjusting member 35. While it may be possible to manually operate piston 48, it is prefrered to provide a several motor arrangement. Handle 54 is supported on a journal 53 and pivotally connected with a control slide valve 52.

The control slide valve 52 is mounted in the center bore of the piston rod of piston 46. Fluid passages 50 and 51 are provided in control slide valve 52 for passing fluid from an entrance port 49 through control slide valve 52 into the respective chambers 47 and 48 whereby the position of piston 46 is changed. When control slide valve 52 is moved upwardly, fluid flows through passage 47 into chamber 45 for moving piston 46 upward. Consequently, piston 46 follows the upward movement of control valve slide 32, and when control slide valve 52 is moved downward, then fluid flows through passage 48 into chamber 44 for pressing piston 46 downward. Ring chambers are provided in control slide valve 52 and piston 46 for connecting the passage 47 and 48, and 50 and 51, for example, as shown in FIG. 1. It is very easy to move control slide valve 52 since the same is not subjected to fluid pressure so that practically no manual force is required for moving lever 54. The movement of control slide valve 52 causes movement of piston 46 by a great fluid power force, so that the stroke and displacement volume adjustment means 33 can be easily operated by adjusting member 35.

Return flow out of chambers 44 and 45 flows through the connected passages 47 or 48 and 50 or 51, and through slide valve 52, and downward through a hole in the housing 55. It is important that passages 47 and 48 are slanted to the axis of the cylinder and piston, so that uniformity of movement of the slide valve 42 and piston 46 is assured.

Figure 4:
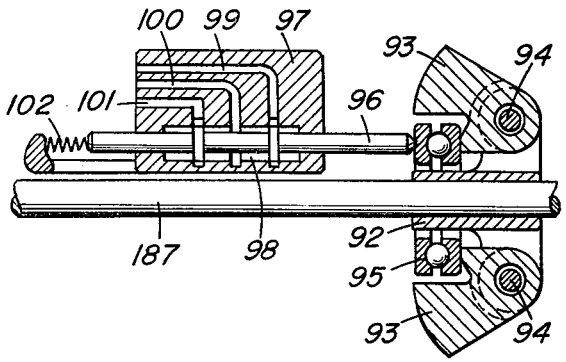
FIG. 4 is a longitudinal sectional view illustrating a centrifugal control means for automatic control of the embodiment of FIGS. 1–3.

For fully automatic control of the hydrostatic transmission depending on the rotary speed of output shaft 87, the device shown in FIG. 4 may be used. A centrifugal weight means 93 is mounted for swinging movement in bearings 94 which are fixed to the output shaft 87 of the transmission, or to an extension 187 of the same. The rotating output shaft 187 drives centrifugal weights 93 outward so that the fingers on weights 93 act on the bearing 95 which cooperate with a piston rod 96 having piston portions located in a cylinder bore of a control member 97. A spring 102 acts on piston rod 96 opposite to the action of the centrifugal weights 93. When the rotary speed of the output shaft increased, and shaft 187 rotates at a high speed, piston rod 96 is displaced against the action of spring 102. Control member 97 has an inlet 104, for fluid flowing into a control space 98 in member 97, and depending on the position of piston rod 96, fluid flows from control space 98 either out of fluid passage 99, or out of fluid passage 101. Fluid passage 101 is connected with port 39 in FIG. 1, andw fluid passage 99 is connected with port 38. Consequently, when the spring force is higher, piston rod 96 moves to the right, and fluid flows from the transmission, or from any other fluid power source, into cylinder chamber 40 for adjusting motor 20 to perform an increased stroke, and finally a maximum stroke. However, if the rotor speed of shafts 87 and 187 increases to a certain predetermined value, then the centrifugal weights 93 moves the piston rods 96 to the left as viewed in FIG. 4 so that fluid flows from entrance port 100, through passage 101 into chamber 41 for pressing piston 42 downward so that the motor is adjusted to perform a smaller displacement stroke, and finally assumes the self-locking position when piston 42 abuts stop 43.

Depending on the rotary speed of output shaft 87, motor 20 is automatically adjusted to either perform a large stroke resulting in a large displacement volume, or to have a minimum displacement value in which the motor is self-locked and stops. As will be explained hereinafter when the motor is locked, power is transmitted between the input shaft 56 and output shaft 87 by a mechanical transmission.

The innermost portions of pump rotor 1 and motor rotor 20 form hollow shafts in which a central connecting shaft 69 is located. Connecting shaft 69 has one end portion 61 located in the region of the input shaft 56 coaxial with the same, and another end portion projecting from the hollow motor shaft in the region of the output shaft 87. Input shaft 56 is mounted in bearings on housing 55 for rotation and carries a sun gear 57 cooperating with the planetary gear 58 mounted, together with planetary gear 59, for rotation on a planetary carrier 64 which is constructed as a housing. Planetary carrier 64 is fixed connected with the hollow pump shaft 66, while a second sun gear 60, meshing with planetary gears 59 is secured to the end portion 61 of central connecting shaft 69.

A brake band 63 is mounted on the peripheral surface of planetary carrier housing 64, and can be operated by a means 188 to block rotation of the planetary carrier housing 64.

Figure 3:
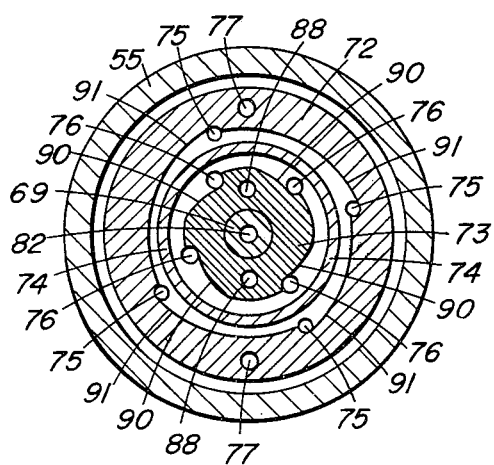
FIG. 3 is a cross-sectional view taken in FIG. 1 on line III—III.

Central connecting shaft 69 is mounted in a bore 71 in the hollow shaft 70 of the pump rotor 20 and carries a clutch member 73 which is part of a one-way clutch means. Output shaft 87 is also mounted in bearing of housing 55 and is fixed to a rotary member 79 from which annular clutch member 74 projects into a gap between the periphery of clutch member 73, and clutch member 72 which is fixedly connected with a pump shaft 70. The relative position of the clutch members is best seen in the cross-sectional view of FIG. 3. Between the annular clutch member 74, and the annular members 72 and 73, clamping rollers 75 and 76 are mounted so that clutch member 74 is either coupled with clutch member 72 and the motor shaft 70, or is coupled with clutch member 73 and with connecting shaft 69, depending on the rotary speed of the parts. When members 73 and 74 are coupled, output shaft 87 is connected with central connecting shaft 69, and when clutch member 74 is coupled with clutch member 72, output shaft 87 is driven from the hollow motor shaft 70 of the hydrostatic transmission. The overrunning clutch means illustrated in FIGS. 1 and 3 operate automatically inasmuch as the faster rotating clutch member, either member 72 or member 73, is coupled with clutch member 74 and output shaft 87 by pressing rollers 75 or 76, respectively, to a clamping and coupling position, or by loosening rollers 75 or 76 from the slower rotating member 72 or 73.

The rotatable clutch member 72 has inclined faces 91 for pressing the rollers 75 into a coupling position for clamping member 74. When rollers 75 are clamped by the inclined faces 91 and member 74, members 72 and 74 are coupled and rotate at the same speed. The inclined faces 91 are inclined in a given direction so that the clutching effect occurs during rotation in one direction only, whereas in the event of opposite rotation, rollers 75 disengage member 72 from member 74.

When member 73 rotates with shaft 69, the rollers 76 roll along the inclined faces 90 of member 73 and are pressed against the inner surface of member 74 so that clutch members 73 and 74 are connected. The inclined faces 90 are inclined in the direction opposite to the inclination of faces 91 of member 72, so that either clutch member 72 or clutch member 73, depending upon which one rotates faster, is coupled with clutch member 74.

For driving output shaft 87 in opposite directions, it is advantageous to provide coupling means for directly coupling motor shaft 70 with output shaft 87. A fluid pressure passage 67, which may communicate with chambers 5 or 6, supplies pressure fluid into a chamber 81 within clutch member 79 which is connected with output shaft 87. Chambers 5 or 6 are particularly suitable for providing pressure fluid for this purpose because they are connected by fluid passages with pump 1. During the displacement strokes of the pump, one or the other chambers 5 or 6 is connected with the discharge conduit of the pump in which high pressure prevails. When the pump stroke is adjusted to be reversed, fluid under pressure from chambers 5 or 6 flows through passage 67, through sealed chamber surrounding shaft 69, into and through a central passage 68 in connecting shaft 69, out of passage 68 into the control chamber 81 in rotary member 79 which is connected with output shaft 87 for rotation.

Coupling pins 78 are mounted in corresponding bores opposite coupling recesses 77 in clutch 72 which is connected with the motor shaft 70 for rotation. When pressure fluid is supplied into control chamber 81, coupling pins move in axial direction into coupling recesses and couple members 72 and 79 for rotation so that output shaft 87 is coupled with pump shaft 70.

When the pump is adjusted to reverse its flow, members 79 and 72 are coupled to each other, and motor 20 drives output shaft 87. When the pump is reversed, the motor 20 rotates in the opposite direction, and since output shaft 87 is automatically coupled with motor shaft 70, the output shaft 87 rotates in the opposite direction after reversal of the pump stroke and discharge flow of the pump. Instead of connecting passage 67 with chambers 5 or 6, other pressure chambers such as 14, 15, or 301 to 306, see FIG. 2, could be used for supplying pressure fluid.

It is advantageous to provide another coupling between output shaft 87 and the central connecting shaft 69 so that reversal of the direction of rotation of the input shaft 56 can be directly transmitted to the output shaft 87 by means of central connecting shaft 69, in which event clutch 73 to 76 may be inactive.

Clutch member 79 is formed with small cylinder chambers 86 in which piston heads of piston pins 84 are located. Springs bias piston pins 84 to a retracted position shown in FIG. 1. When pressure is supplied to cylinder chamber 86, piston pins 84 advance, moving through corresponding bores in the left wall of clutch member 79, and finally enter coupling recesses 88 in member 73 so that members 73 and 79, together with output shaft 87, are coupled to each other and driven by central connecting shaft 69 from the input shaft, without the intermediary of the hydrostatic transmission. The spring means 85 in cylinder chamber 86 urge coupling piston pins 84 to the normal retracted positions in which the output shaft with clutch member 79 can rotate freely in relation to member 73 while its portion 74 is clutched to clutch member 72 of hollow motor shaft 70. Pressure fluid is supplied to cylinder chambers 86 through fluid passages, not shown, communicating with a high pressure chamber of pump 1.

OPERATION

The variable transmission described above may be used in a vehicle or other machine, and serves the purpose to transform the power derived from a power plant and acting as a drive torque on an input shaft 56, into a higher torque at the output shaft 87 which drives the machine or propels the vehicle. A transformation of power into a high torque is preferably effected by the hydrostatic transmission 1, 20. At higher speeds and lesser torques, or even at generally higher speeds, it is preferred that the transmission transfers power mechanically without the higher losses of the hydrostatic transmission.

If initially the torque acting on output sun gear 60 is greater than the drive torque acting on input shaft 56, input shaft 56 rotates and drives input sun gear 57 which rotates the planetary gears 58 and 59. Since sun gear 60 cannot rotate due to the assumed high torque acting on connecting shaft 69, 62, sun gear 60 will not rotate so that the planetary gears 58 and 59 will revolve about the axis of shaft portions 61 and rotate the planetary carrier housing 64 in which planetary gears 58 and 59 are rotatably mounted. Carrier housing 64 is connected with drive shaft 66 of pump 1 so that the pump shaft and rotor body 1 of the pump are driven to rotate at the same rotary speed and in the same direction of rotation as carrier housing 64. These conditions occur at the start of the machine or vehicle after the pump has been adjusted to an idling position in which the pump does not discharge fluid into motor 20. This condition is obtained by operation of the pump adjusting means including adjusting member 35, control slide valve 52, and handle 54. By moving handle 54 to a starting position, the eccentricity between the axis of rotation of rotor body 1 of the pump, and of the displacement means 33, 34 is adjusted to zero, or almost zero, so that the torque required for rotating the pump is very small so that the resistance against the turning of sun gear 60 with connecting shaft 61 and 69 is greater, and the carrier housing 64 rotates with the pump rotor 1. In this idling condition, output shaft 87 is not driven, but the rotary parts of the pump rotate at full speed.

In order to start movement of the vehicle or machine, output shaft 87 must provide a drive torque for overcoming a load torque. Adjusting means 35 is adjusted under the control of handle 54 so that the displacement means 31, 33, 34 are displaced to a positon in which they are displaced eccentrically to the rotor body 1 whereby the pistons 201 perform strokes in the displacement chambers 14 and 15 in rotor 1 of the pump. Consequently, fluid, such as oil, is pumped into displacement chambers 25 in rotor 20 of the motor. Motor adjusting means including piston 42 and adjusting member 36 are also adjust, if desired automatically by the device of FIG. 4, to set the displacement volume and displacement stroke of the motor to a maximum stroke. Due to the resulting expansion of the displacement chambers of the motor, fluid flows from the pump to the motor. The fluid flows under pressure out of the pump displacement chambers 14 and 15 and enters the expanding displacements chambers 25 of the motor so that the rotor 20 of the motor rotates with motor shaft 70.

The rotary speed of motor rotor 20 with the hollow motor shaft 70, is determined not only by the rotary speed of input shaft 56 and of the hollow pump shaft 66, but mainly by the length of the stroke of the displacement means of the pump, and by the length of the stroke of the displacement means of the motor. For obtaining a maximum output torque, the adjusting means 42, 36 of the motor must set the motor to a maximum stroke and to maximum displacement volume. This can be obtained by manual pressure on the projecting portion of piston 42, or the same may be controlled by member 97 under the action of spring 102 whe output shaft 87 does not drive shaft 187 with the centrifugal weights 93 of the device shown in FIG. 4. When motor rotor 20 and shaft 70 rotate due to the supply of pressure fluid from the pump to the motor, clutch member 72, which is secured to the hollow motor shaft 70 starts to rotate. The direction of rotation is such that the inclined faces 91, see FIG. 3, operate the rollers 75 to couple members 72 and 74 so that torque is transferred by shaft 70, clutch means 72, 75, 74, to output shaft 87 so that the machine or vehicle provided with the transmission starts its motion. The rotary speed and torque of output shaft 87 can be further adjusted by operation of the pump adjusting device 35, 48, 52, 54, or of the motor adjusting device 36, 42, preferably under control of the speed responsive device shown in FIG. 4.

In the above-explained condition of the transmission, a great torque is supplied to the output shaft, as is desirable for starting motion of a machine or a vehicle. If it is desired to operate the machine or vehicle at a higher speed so that a lesser torque is required, of if a direct mechanical transmission of power between the input shaft 56 and the output shaft 87 is desired to reduce the losses, then the motor adjusting means 36 is either manually, or automatically, adjusted so that the displacement stroke of the displacement means 12, 28, 29, 32, and thereby the displacement volume, is reduced gradually so that the rotary speed of output shaft 87 is gradually increased.

At the certain maximum speed, piston 42 of the motor adjusting means abuts stop 43, so that the displacement volume of the motor cannot be further reduced. At this speed, and in this position of the motor adjusting means, the stroke of the displacement means and the displacement volume are so small that the output torque of the motor acting on motor shaft 70, is less than the torque produced by fluid friction in the motor, so that the motor stops rotating in a self-locking position, irrespective of further increase of the pressure of the fluid in the motor displacement chambers. The self-locking of the motor as shown in FIG. 1 occurs only if the displacement volume of displacement chambers 25 is very small, for example about less than 4% of the maximum displacement volume of displacement chamber 25.

As the displacement volume of the motor is decreased, and the motor approaches its self-locking condition so that the fluid pressure in the pump and motor are increased, the required input torque of the pump increases. As a consequence of the increase of the power and torque required by the pump, the planetary carrier housing 64 is no longer able to supply a sufficient drive torque to pump shaft 66 for rotating the pump at full speed. The more the torque required by the pump increases, the more increases the resistance of the pump against being driven, and consequently the planetary carrier housing rotates slower, and when the motor has reached its self-locking condition, the pressure in the pump increases to a maximum, and rotation of pump rotor body 1 stops. Planetary carrier housing 64 is also stopped by the stopped pump shaft 66, and if desired, the brake band 63 may now be operated by a manual control means 188 to completely stop and lock the planetary carrier housing 64 to make it independent of any momentary rotation of the pump or motor.

Since planetary carrier housing 64 is stopped, the rotary motion and the input torque of input shaft 56 is transferred by input sun gear 57 to the planetary gears 58, 59 so that the same rotate in the planetary carrier housing 64, and transmit torque to the output sun gear 60 which drives shaft portion 61 and central connecting shaft 69.

In this condition of the transmission, torque is mechanically transferred through the differential transmission 57 to 60, and 64, central connecting shaft 61, 69, clutch member 73, secured to connecting shaft 69, and rollers 76 to clutch portion 74 of clutch member 79 which is connected with output shaft 87. Central connecting shaft 69 is freely rotatable in bores 21 in the hollow pump shaft 66 and hollow motor shaft 70, and has a portion 61 fixedly secured to output sun gear 60, and a portion 62 freely rotatably supporting input sun gear 57.

Since clutch member 73 rotates, clutch rollers 76 roll along faces 90 of member 73 so that clutch member 73, 74 are coupled. Due to the stopping of the motor in the self-locking condition, motor shaft 70 is also stopped with clutch member 72 so that the clutch rollers 76 disengage clutch member 74 from clutch 72, and output shaft 87 is driven only from the central connecting shaft 69 through clutch members 73, 74, 79. Rotary motion and torque is mechanically transmitted from input shaft 56 to output shaft 87, and the hydrostatic transmission is in a stopped inoperative condition.

The condition of the transmission in which the same acts as a mechanical transmission, is most economical for high speed and low torque operations, and is most efficient since hydraulic losses are prevented. When pressure fluid is supplied to cylinder chambers 86, piston pins 84 are moved into coupling recesses 88 in member 73, so that connecting shaft 69 is directly coupled with output shaft 87, irrespective of the engagement of clutch means 73, 74, 76. This stage of the transmission is particularly suitable for high speed movement of a vehicle on a highway.

As explained above, a transmission has a starting condition in which high torque is transmitted by the hydrostatic transmission, and a direct drive condition in which the output shaft is rotated at the high speed by the mechanical transmission including connecting shaft 69. Between these two extreme operational conditions, transmission has intermediate stages in which part of the power is transmitted by the hydrostatic transmission, and another part of the power is transmitted by the mechanical transmission, both being simultaneously operated. When clutch members 72 and 73 are both coupled with clutch member 74, central connecting shaft 69 and the hydraulic transmission 1, 20 rotate simultaneously.

If a differential gear similar to the differential gear between input shaft 56 and shaft 66 and 69 is provided between central connecting shaft 69, motor shaft 70, and output shaft 87, any desired or suitable ratio between the power transmitted mechanically and hydrostatically can be obtained. The differential transmission driven by input shaft 56 is shown by way of example, and any other suitable transmission may be provided for driving pump shaft 66 or central connecting shaft 69 from input shaft 56 in accordance with the operational conditions. For example, double overrunning clutch means similar to clutch means 72 and 76 may be provided.

When the transmission used for a vehicle, the hydrostatic transmission can be used in heavy city traffic, or on steep grades, and a mechanical transmission may be used on highways when higher speeds are desired.

It is also possible to reverse the direction of rotation of output shaft 87 without reversing the direction of rotation of input shaft 56 which is connected to a prime mover. For driving the transmission in reverse, the position of the displacement means 31, 33, 34 is adjusted by the pump adjusting means 35, 48, 50, 54 beyond the zero stroke position. It is also possible to change the direction of rotation of the output shaft 87 by a reversing gear means, but the reversal by means of adjustment of the pump displacement means is simpler and smoother. For driving the machine or vehicle in reverse, pressure fluid is supplied to chamber 81 in clutch member 79 and moves coupling pins 78 into coupling recesses 77 in clutch member 72 which is secured to the hollow motor shaft 70. In this manner, motor shaft 70 is directly coupled with output shaft 87, and the same is driven in reverse direction when the delivery direction of the pump is reversed, causing reversal of direction of rotation of the motor. Due to the direct coupling 78, 77, the uncoupling of the clutch means 76, 74 due to the reversal of motor shaft 70 is of no consequence.

During direct forward drive, when the mechanical transmission is effective, and the losses are the lowest, brake 188 may be operated automatically by a device as shown in FIG. 4 so that the pump is completely stopped at the high speed of the vehicle, and any flow of fluid between the pump and the motor ceases. In this manner, any fluid losses in the hydrostatic transmission are eliminated, and the transmission performs at highest efficiency. When the speed of the vehicle is reduced, the brake is released, and the hydrostatic transmission becomes operative. For example, if the rotary speed of output shaft 87 drops below a predetermined minimum speed at which hydrostatic transmission of torque is preferred to the mechanical transmission of force, the fluid is supplied by the adjustment of control means 97, into control chamber 40 of the motor adjusting means so that motor adjusting piston 42 adjusts the displacement volume of the motor to a maximum, while at the same time, brake band 63 is released, assuming it was closed. The resistance of the motor against being driven becomes so small when its stroke is increased to a maximum, that the pump can start to rotate and to discharge fluid into the motor for driving the same. The differential transmission, driven by the input shaft 56, will perform perfectly responding to the ratio of the load torques acting on the central connecting shaft 69 and on the pump shaft 66.

Consequently, the advantages of the transmission of the invention do not only reside in the automatic switching from mechanical to hydrostatic transmission of torques, but also in the stepless smooth transition between a hydrostatic drive and a mechanical drive, and vice versa.

The novel stepless change from one form of transmission to the other, and the smoothness of the change, increases the efficiency of the transmission, particularly at low output speeds when high torque is required. The arrangement assures the highest acceleration of the vehicle from standstill, and is particularly valuable in city traffic.

Referring now to FIG. 5, which illustrates a modified part of FIG. 2, cooling heat exchangers 559, 563 are provided together with valves 561 and 556 by which passages 305 or 306 can be opened and closed. Valves 561 and 556 have passages 562 and 557, respectively, and are turnable through an angle of 90 degrees for opening and closing the passages. As compared with the arrangement of FIG. 2, the chamber 558 communicates with space 5 and fluid line 555, while chamber 564 communicates with space 6 and fluid line 554. Chambers 558 and 564 contain fluid which is cooled by heat exchangers 559 and 563, respectively. Fluid lines 305 and 306 lead to the motor 20. Passages 554 and 555 may be used to supply another fluid motor with cooled fluid, or closed in the embodiment of FIG. 1.

Due to the fact that the displacement chambers expand and contract in radial direction, the transmission is short in axial direction, resulting in a compact construction suitable for small available spaces in a vehicle. Axial piston has transmissions at a greater axial length, so that they are difficult to mount on a vehicle. The rotary piston pump and vane motor used in the preferred embodiment of the invention, effect very long strokes, and consequently the highest power transmission for a hydrostatic transmission having a predetermined small diameter. A radial piston pump as disclosed, produces the greatest power for the smallest space, while the vane motor of the preferred embodiment of the invention assures the highest torque for small motor. The combination of a double-flow radial piston pump with a vane motor results in a suitable transmission characteristic, because the radial piston pump assures high uniformity flow and high pressure, while the long vane stroke of the motor assures the highest possible torque with a direct tangential power action. Thereby, the losses which may occur in other hydrostatic transmissions during changing of axial motion into rotary motion, are avoided in the preferred embodiment of the invention.

Due to the fact that the central connecting shaft of mechanical transmission is located in bores of the pump rotor and motor rotor, the pump and motor rotor can rotate at equal or different speeds, while the central connecting shafts 69 rotates at the same or different speeds than the pump and motor. The fact that the connecting shaft of the mechanical transmission extends through the pump and the motor eliminates the structure adjacent the pump and motor, and result in a very compact construction.

The principle of the invention according to which a shifting of the transmission is obtained by adjusting the motor to a self-locking position, is entirely novel, and results in a particularly smooth shifting of the transmission between different operational conditions. Since the pump rotor and motor rotor are preferably axially movable to a limited extent, it is advantageous that the displacement means are also movable in axial direction to a limited extent with the displacement members 12 or 33. It is also advantageous for the displacement means or stroke controlling elements such as 34, 28, 12 to be adjustable in axial direction relative to the displacement means such as pistons 201 or vanes 22, or vane assemblies 22, 26, 27. The construction of the preferred embodiment disclosed in FIGS. 1 and 2, makes it possible to adjust the clearances between the control faces in an effective range depending on pressure, viscosity of the fluid, heat, and internal expansion of the material used for the parts.

It will be understood that each of the elements described above, or two or more together, may also find a useful application in other types of transmissions differing from the types described above.

While the invention has been illustrated and described as embodied in a variable hydrostatic-mechanical transmission, it is not intended to be limited to the details shown, since various modifications and structural changes may be made without departing in any way from the spirit of the present invention.

What is claimed as new and desired to be protected by Letters Patent is set forth in the appended claims.

I claim:

1. Variable transmission comprising, in combination, a hydrostatic transmission including a rotary pump means and a rotary motor means in fluid communication, said pump means and said motor means including a rotary pump body and a rotary motor body, respectively, said pump body having a hollow pump shaft and said motor body having a hollow motor shaft, said pump body and said motor body being formed with pump chambers and motor chambers, respectively, said pump means and said motor means further including pump displacement means and motor displacement means movable in said pump chambers and motor chambers, respectively, for displacing fluid in the same; a connecting shaft mounted in said hollow pump shaft and in said hollow motor shaft for free rotation and having one end portion located in said hollow pump shaft, and an other end portion located in said hollow motor shaft; an input shaft; a first transmission connecting said input shaft with said one end portion of said connecting shaft and with said hollow pump shaft and transmitting power from said input shaft to the same depending on the load torque produced by said pump means; an output shaft; and a second transmission connecting said output shaft with said other end of said connecting shaft and with said hollow motor shaft and transmitting power from the same to said output shaft depending on the relative speed of said connecting shaft and motor shaft whereby different speed ratios and different torque ratios between said input shaft and said output shaft are obtained.

2. A variable transmission as claimed in claim 1 wherein said hydrostatic transmission includes a housing having support portions; abutment means mounted on said support portions for limited axial movement and including a central abutment member located between said pump body and said motor body, and two end members abutting the outer ends of said pump body and said motor body; and wherein said housing has a portion forming with one of said end members a fluid pressure chamber for axially displacing said abutment means with said pump body and with said motor body to a position in which the other end member abuts a support portion of said housing; and wherein said central member is formed with passages for connecting said pump means with said motor means.

3. Variable transmission comprising, in combination, a hydrostatic transmission including a rotary pump means and rotary motor means in fluid connection, motor adjusting means for varying the displacement volume of said motor means to a self-locking minimum volume, said pump means and said motor means having a hollow pump shaft and a hollow motor shaft, respectively; a connecting shaft mounted in said hollow pump shaft and in said hollow motor shaft for free rotation and having one end portion located in said hollow pump shaft, and another end portion located in said hollow motor shaft; an input shaft; a first transmission connecting said input shaft with said one end portion of said connecting shaft and with said hollow pump shaft and transmitting power from said input shaft to the same depending on the load torque produced by said pump means; an output shaft; and a second transmission connecting said output shaft with said other end of said connecting shaft and with said hollow motor shaft and transmitting power from the same to said output shaft depending on the relative speed between said connecting shaft and said motor shaft whereby by adjustment of the displacement volume of said motor means by said motor adjusting means, different speed ratios and torque ratios between said input shaft and said output shaft are obtained.

4. A variable transmission as claimed in claim 3 and including speed responsive control means driven from said output shaft and being connected with said motor adjusting means so that the same is adjusted in accordance with the output speed.

5. Variable transmission comprising, in combination, a hydrostatic transmission including a rotary pump means and a rotary motor means in fluid communication, pump adjusting means for varying the displacement volume of said pump means, and motor adjusting means for varying the displacement volume of said motor means, said pump means and motor means having a hollow pump shaft and a hollow motor shaft, respectively; a connecting shaft mounted in said hollow pump shaft and in said hollow motor shaft for free rotation and having one end portion located in said hollow pump shaft, and another end portion located in said hollow motor shaft; an input shaft; a first differential transmission connecting said input shaft with said one end portion of said connecting shaft and with said hollow pump shaft and transmitting power from said input shaft to the same depending on the load torque produced by said pump means; an output shaft; and a second transmission including a first overrunning clutch means connecting said pump means with said output shaft, and a second overrunning clutch means connecting said other end portion of said connecting shaft with said output shaft so that power is transmitted to said output shaft depending on the relative speed of said connecting shaft and said motor shaft whereby by adjustment of the displacement volume of said pump means and said motor means by said pump adjusting means and said motor adjusting means, respectively, different speed ratios and torque ratios between said input shaft and said output shaft are obtained.

6. A variable transmission as claimed in claim 5 wherein said pump means and said motor means include a rotary pump body and a rotary motor body, respectively, fixedly connected to said pump shaft and said motor shaft, respectively, for rotation, said pump body and said motor body having pump chambers and motor chambers, respectively; wherein said pump means and said motor means include pump displacement means and motor displacement means movable in said pump chambers and said motor chambers, respectively, for displacing fluid in the same; and wherein said pump adjusting means and said motor adjusting means are operable for moving said pump displacement means and said motor displacement means relative to the pump body and motor body, respectively, for varying the volume displaced in said pump chambers and said motor chambers, respectively.

7. A variable transmission as claimed in claim 6 wherein said hydrostatic transmission includes means forming fluid communication passages between said rotary pump means and said rotary motor means; and comprising valve means in said communication passages for reducing the flow cross-sections of the same whereby flow of fluid from said pump means to the motor means is reduced, and a greater amount of power is transmitted through the differential transmission, said connecting shaft, and said second transmission to said output shaft.

References Cited

UNITED STATES PATENTS

| | | | |
|---|---|---|---|
| 1,951,345 | 3/1934 | Centervall | 74—687 |
| 2,517,879 | 8/1950 | Howard | 74—687 X |
| 2,573,472 | 10/1951 | Martin | 60—53 X |
| 2,591,363 | 4/1952 | Kraft et al. | 74—687 |
| 2,782,724 | 2/1957 | Humphreys | 103—216 X |
| 2,817,250 | 12/1957 | Forster | 74—687 |
| 2,946,194 | 7/1960 | Westbury. | |
| 2,994,233 | 8/1961 | Gerard | 74—687 |
| 2,995,049 | 8/1961 | Bolliger | 74—687 |
| 3,270,685 | 9/1966 | Eickmann | 103—161 |
| 3,357,362 | 12/1967 | Orr | 103—161 |
| 3,212,358 | 10/1965 | De Lalio | 74—687 |

DONLEY J. STOCKING, Primary Examiner

T. C. PERRY, Assistant Examiner

U.S. Cl. X.R.

60—53; 103—161